Patented Nov. 4, 1924.

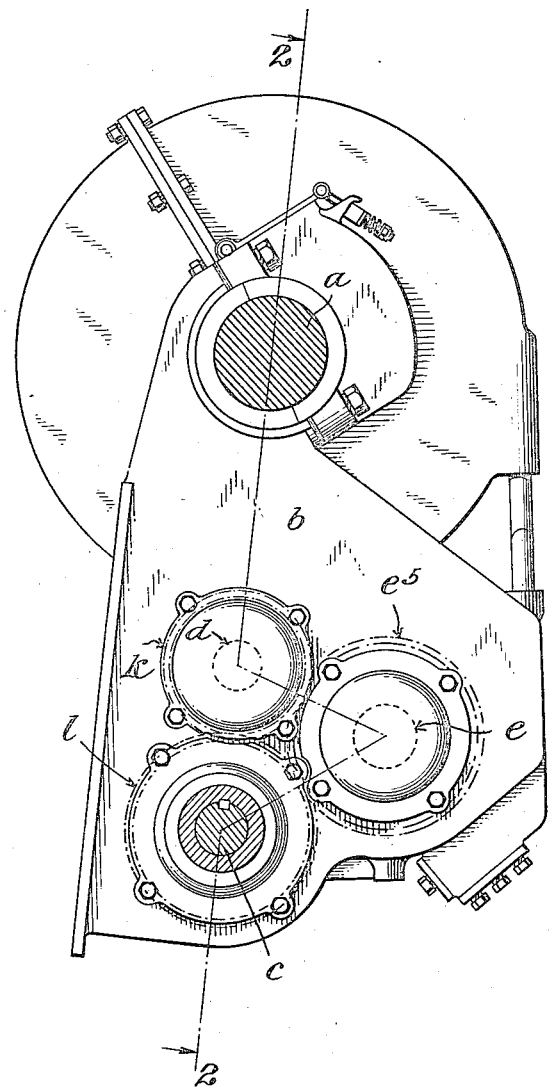

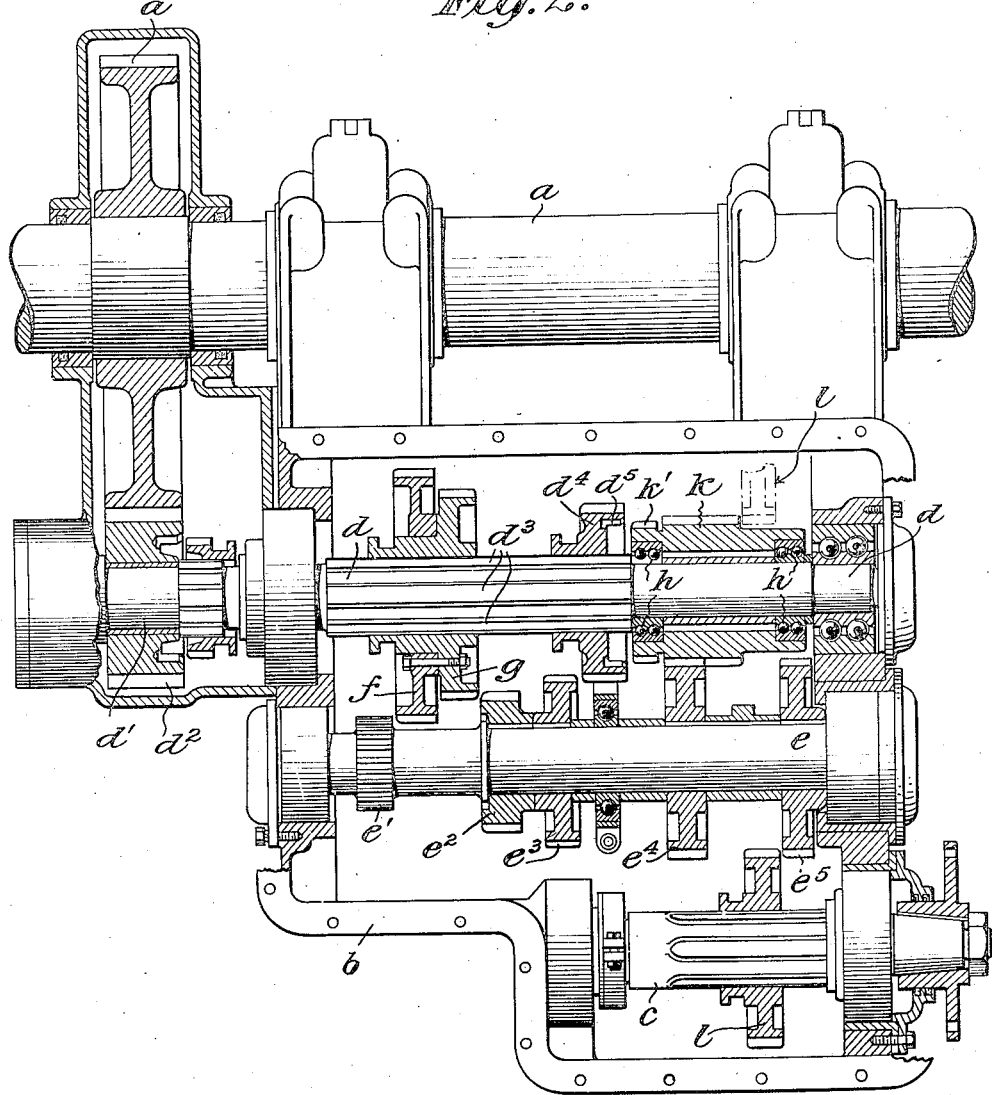

1,513,822

UNITED STATES PATENT OFFICE.

LYMAN C. JOSEPHS, JR., AND MARTIN L. SHEETZ, OF ALLENTOWN, PENNSYLVANIA, ASSIGNORS TO INTERNATIONAL MOTOR COMPANY, OF NEW YORK, N. Y., A CORPORATION OF DELAWARE.

TRANSMISSION.

Application filed August 20, 1923. Serial No. 658,262.

*To all whom it may concern:*

Be it known that we, LYMAN C. JOSEPHS, Jr., and MARTIN L. SHEETZ, citizens of the United States, both residing in the city of Allentown, in the State of Pennsylvania, have invented certain new and useful Improvements in Transmission, of which the following is a specification, reference being had to the accompanying drawings, forming a part hereof.

This invention relates to improved change speed transmission which is characterized by simplicity of construction, fewness of parts, ruggedness, compactness and efficiency in the transmission of power from a driving shaft to a driven shaft with speed reductions provided for selectively in either forward or reverse direction. More particularly, the improved transmission is characterized by the provision of a sliding gear on the driving shaft through which reverse speed may be obtained and also by the provision of a constant mesh gear mounted loosely on the main shaft. The loose gear on the main shaft is engageable by the said reversing gear on the driving shaft upon selective operation thereof to transmit power for driving in the forward direction. Another distinctive feature of the improved transmission is that the box has mounted therein only three shafts on which are provided gears by which four speeds forward and four speeds reverse may be obtained. In such a box the four speeds forward and four speeds reverse are obtained from power which is transmitted through a single sliding gear on one of the shafts disposed ahead of all of the change speed gears, that is, disposed on the driving shaft.

The construction of the improved transmission will appear more clearly from the detailed description given hereinafter with reference to the preferred embodiment shown in the drawings, wherein:

Figure 1 is a view in side elevation of the transmission case, the driving shaft and driven shaft being shown in section, the particular embodiment illustrated being that designed for use with a rail car.

Figure 2 is a view in horizontal section through the box and taken on the planes indicated by the broken lines 2—2 of Figure 1 and looking in the direction of the arrows.

As the description proceeds it will be understood that the invention will find wide usefulness in any field where change speed transmission of the selective type is to be afforded although its principal usefulness is in connection with the transmission of power where four speeds forward and four speeds reverse are desired. For instance, in rail cars propelled by internal combustion engines it has been found that the improved transmission is especially well adapted by reason of its compactness, simplicity of construction and efficiency in the transmission of power from the motor to the final drive. The embodiment of the invention illustrated in the accompanying drawings indicates its incorporation in a rail car structure where, for instance, transmission is associated directly with a drive axle $a$ of the propelling truck.

Considering now the construction of the transmission itself or those features which characterize it the box $b$ has journaled therein what will be termed the engine shaft $c$, the main shaft $d$ and a countershaft $e$. The engine shaft may be coupled in any usual manner with the source of power while the main shaft $d$ may deliver the power through a shaft $d'$ which, in the illustrated embodiment, is geared through pinion $d^2$ and gear $a'$ to the driven axle $a$. The invention is not concerned with this phase of the design. The changes in speed whether in forward or reverse are effected, generally speaking, by the sliding of the compound gears $f$, $g$, connected as a unit and slidable along splines $d^3$ of the main shaft $d$ and by the sliding along these splines of the gear $d^4$. The co-operating gears are fixed on the countershaft $e$, gear $e'$ being engageable by gear $f$ for first speed, gear $e^2$ being engageable by gear $g$ for second speed, gear $e^3$ being engageable by gear $d^4$ for third speed and fourth speed being obtainable by direct drive through the main shaft $d$ in a manner now to be described. On the main shaft $d$ is journaled loosely as through roller bearings $h$ a compound gear $k$, $k'$, the gear $k$ being in constant mesh with gear $e^4$ fixed on the countershaft $e$ and the other gear section $k'$ being engageable by internal gear clutch $d^5$ formed with the gear $d^4$ whereby direct drive, that is, fourth speed, may be secured. Having provided in the manner described for the four different speeds it remains to describe the novel way in which driving power is impressed on the gear sets ahead of them in either the forward or reverse direction. On the engine shaft $c$ is splined a gear $l$ which will, for convenience, be hereinafter termed a reversing gear since through its instrumentality drive may be effected in either the forward or reverse direction. The gear $l$ is engageable with the gear $k$ as indicated by the dotted line fragment shown in Figure 2 in which case power is applied to the meshed gears to insure operation in a forward direction while the gear $l$ may also be slid from engagement with the gear $k$ into engagement with a gear $e^5$ fixed on the countershaft $e$ for transmission of power to the meshed gears for driving in reverse direction.

As described, the improved features of the invention reside in the provision of a sliding gear on the engine shaft ahead of the change speed sets by which speeds in either the forward or reverse direction may be obtained and in the provision of a constant mesh gear mounted loosely on the main shaft and engageable by said sliding gear on the engine shaft for driving in the forward direction. The entire transmission is very simple and compact and power is transmitted efficiently by reason of the relation of parts.

Changes having to do merely with details of design or construction may be made without departing from the spirit of the invention so long as the advantageous results sought for are obtained by means which are mechanically equivalent.

What we claim is:

1. In a transmission, in combination with a driving shaft, main shaft and a countershaft, a compound gear clutch mounted loosely on the main shaft, a sliding gear on the drive shaft engageable with one section of said loosely mounted gear clutch, a gear fixed on the countershaft in constant mesh with one section of said compound gear clutch and a gear splined on the main shaft and slidable for engagement with a section of said compound gear clutch for direct drive.

2. In a transmission, in combination with a drive shaft, a main shaft and a countershaft, co-operating gears on the main shaft and the countershaft, relatively slidable for selective engagement for different speeds, a gear mounted loosely on the main shaft to transmit power to said change speed gears for driving in the forward direction, a gear fixed on the countershaft for transmitting power to said change speed gears for driving in the reverse direction and a gear slidably mounted on the drive shaft and engageable with said loosely mounted gear or said fixed gear for forward or reverse speed, respectively.

This specification signed this 16th day of August, A. D. 1923.

LYMAN C. JOSEPHS, Jr.
MARTIN L. SHEETZ.